A. G. MELROSE.
POWER TRANSMISSION MECHANISM.
APPLICATION FILED OCT. 2, 1915.

1,207,591.

Patented Dec. 5, 1916.

Witnesses
Chas. H. Trotter
Robt Meyer

Inventor
A. G. Melrose
By
Attorney

UNITED STATES PATENT OFFICE.

ALBERT G. MELROSE, OF CARMEN, OKLAHOMA.

POWER-TRANSMISSION MECHANISM.

1,207,591.  Specification of Letters Patent.  Patented Dec. 5, 1916.

Application filed October 2, 1915. Serial No. 53,794.

*To all whom it may concern:*

Be it known that I, ALBERT G. MELROSE, a citizen of the United States, residing at Carmen, in the county of Alfalfa and State of Oklahoma, have invented certain new and useful Improvements in Power-Transmission Mechanism; and I do hereby declare the following to be a full, clear, and exact description of the invention, such as will enable others skilled in the art to which it appertains to make and use the same.

This invention relates to a power transmitting structure which is particularly adapted for use in connection with motor tractors and harvesting machines, such as self-binding grain harvesters, mowing machines or the like, and the primary object of the invention is to provide a power transmitting structure which is adapted for transferring the power from the tractor to the harvesting machine for operating the harvesting machine by the operation of the tractor, with a minimum amount of lost power, and eliminating the operation of the harvester by the rotation of the bull or supporting wheel of the same, thereby eliminating the liability of the choking or clogging of the harvester in case the same is traveling over soft ground, wherein the supporting wheel might slip.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1:
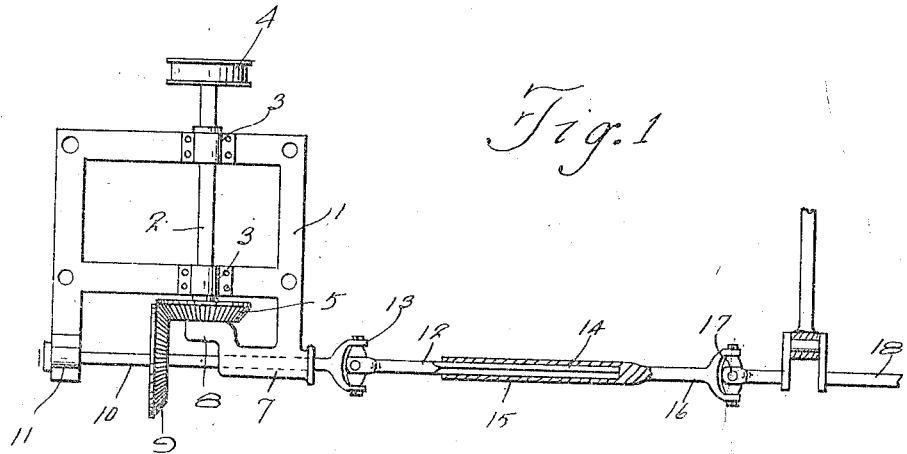
Figure 2:
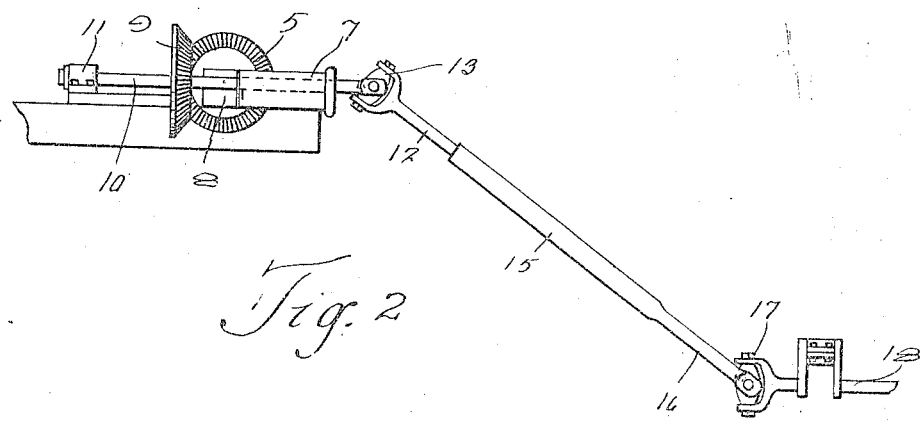

Figure 1 is a side elevation of the improved power transmitting means, showing parts thereof in section, and Fig. 2 is a top plan view of the power transmitting means.

Referring more particularly to the drawings, 1 designates a supporting frame, which is provided for attachment to any desired part of a tractor of ordinary construction. The frame 1 has a shaft 2 rotatably supported by suitable bearings 3, which bearings are carried by the frame 1. A power transmitting pulley or wheel 4 is mounted upon the upper end of the shaft 2, and a beveled gear 5 is mounted upon the lower end of the shaft. The frame 1 has a bearing extension 7 formed upon its lower portion, upon which bearing extension is formed an arm 8. The arm 8 extends upwardly and outwardly from the bearing extension and forms a bearing and support for the lower end of the vertical shaft 2.

The beveled gear 5 meshes with a beveled gear 9, which is mounted upon a shaft 10. The shaft 10 is rotatably carried by the bearing extension 7 and by a bearing 11 which is also carried by the frame 1. The shaft 10 is positioned transversely to the vertical shaft 2, and it is connected to a shaft 12 by a universal joint 13. The shaft 12 has its end remote from the end which is connected to the shaft 10 by the universal joint 13, square or rectangularly shaped in cross section, as is shown at 14, and telescopically seated in the hollow end 15 of a shaft 16. The shaft 16 is connected by a universal connection 17 to the mechanism driving crank shaft 18 of the harvester, which may be of any desired type of harvester now commonly in use.

The telescopic connection between the shafts 12 and 16, permits of a variance in the distance between a tractor and a harvesting machine, and insures the continuous rotation of the shaft 16 of the crank shaft 18, upon a variance of this distance.

The power is transmitted from a tractor to the wheel 4 by any suitable type of means, such as a belt or the like, which rotates the vertical shaft 2. The shafts 10, 12, 16 and 18 are rotated by the rotation of the vertical shaft 2, through the meshing engagement of the beveled gears 5 and 9 and the universal connections between the various shafts as has been heretofore described.

In reducing the invention to practice, certain minor features of construction, combination, and arrangements of parts may necessitate alteration, to which the patentee is entitled, provided such alterations are comprehended within the scope of what is claimed.

What is claimed is:—

In a power transmitting mechanism, the combination with a harvesting machine driving shaft, of a substantially rectangular frame adapted for attachment to a tractor, one end of said frame being extended and having a bearing formed thereon, an arm formed upon one end of said bearing and positioned outwardly therefrom, said arm provided with a bearing opening formed therein which is positioned transversely to said bearing extension, a shaft rotatably supported by said bearing extension, a second shaft having one end rotatably seated in the bearing opening formed in said arm, said second named shaft extending transversely to said first named shaft, bevel gears carried by said first and second named shafts and meshing for rotating the second named shaft upon rotation of said first named shaft, a shaft connected to said first named shaft by means of a universal connection, said last named shaft being adjustable throughout its length, and a power shaft connected to said adjustable shaft through the medium of a universal connection.

In testimony whereof I affix my signature in presence of two witnesses.

ALBERT G. MELROSE.

Witnesses:
HARRY DEAN,
ELLA SUTTER.